A. BRINKOETER.
PLANTER.
APPLICATION FILED NOV. 10, 1908.
930,831.
Patented Aug. 10, 1909.
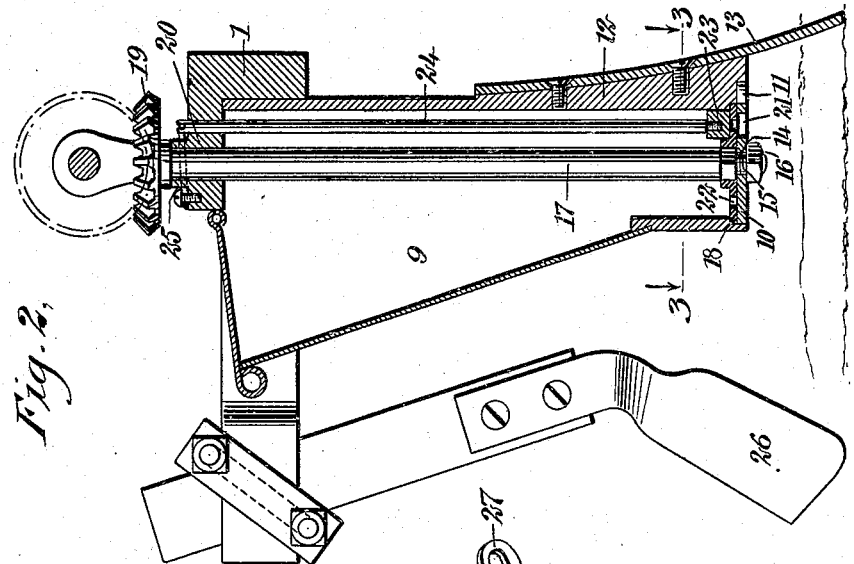
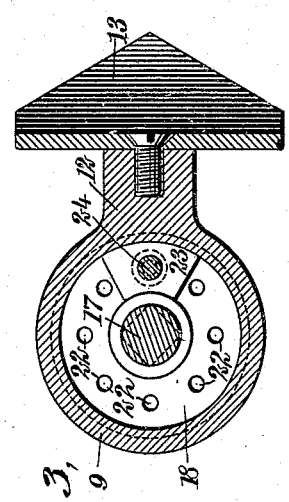
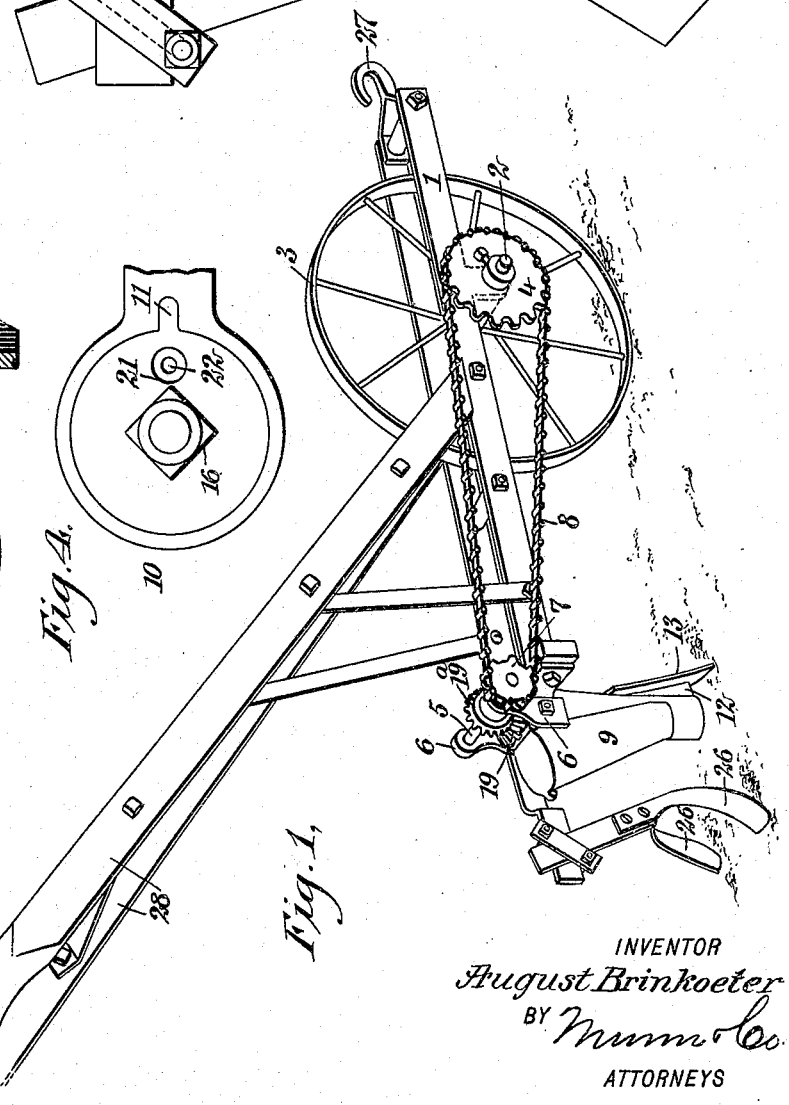
WITNESSES
Edw. Thorpe
E. B. Marshall
INVENTOR
August Brinkoeter
BY Munn & Co.
ATTORNEYS

UNITED STATES PATENT OFFICE.

AUGUST BRINKOETER, OF FLORESVILLE, TEXAS.

PLANTER.

No. 930,831.

Specification of Letters Patent.

Patented Aug. 10, 1909.

Application filed November 10, 1908. Serial No. 461,875.

*To all whom it may concern:*

Be it known that I, AUGUST BRINKOETER, a citizen of the United States, and a resident of Floresville, in the county of Wilson and State of Texas, have invented a new and Improved Planter, of which the following is a full, clear, and exact description.

My invention relates to planters, and it has for its object to provide a planter without springs inside of the seed box which are apt to be chocked or gummed by the seed or dust.

Another object of the invention is to provide a device which is at all times certain in operation, has few parts and is not liable to get out of order.

Still another object of the invention is to provide bottom plates and feed plates of different sizes, which may be used with seeds of different sizes, and also for seed which are to be planted a greater or shorter distance apart.

Still another object of the invention is to provide an arrangement by which the seeds leave the planter so close to the ground that there is no danger of their becoming scattered.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view of the planter; Fig. 2 is an enlarged sectional view showing the seed box and the means by which the seed are distributed; Fig. 3 is a sectional view on the line 3—3 of Fig. 2; and Fig. 4 is an inverted view of the bottom plate which forms the bottom of the seed box.

By referring to the drawings, it will be seen that a frame 1 is provided and that an axle 2 is journaled in the frame, a supporting wheel 3 being secured to the axle 2. A sprocket wheel 4 is also secured to the axle 2, and at the rear of the frame 1 there is a transverse shaft 5 journaled in brackets 6, there being a sprocket wheel 7 secured to the transverse shaft 5, the sprocket wheels 4 and 7 being connected by a sprocket chain 8. A seed box 9 is also disposed at the rear of the frame 1, the rear wall of the seed box 9 diverging upwardly from the forward wall, and in the bottom of the seed box there is secured a bottom plate 10, the bottom plate serving as the bottom of the seed box. The bottom plate 10 has a lug 11 which is disposed in a recess in the enlarged forward wall 12 of the seed box 9, the enlarged forward wall 12 serving as a support for a share 13. In the bottom plate 10 there is an orifice 14, in which is disposed a stud 15, there being a nut 16 which screws on the threaded stud 15 to support the drill plate. The stud 15 is secured to a shaft 17, the shaft 17 having secured thereto a feed plate 18. At the top of the shaft 17 there is a bevel gear wheel 19, which meshes with a bevel gear wheel 19ª, the bevel gear wheel 19ª being secured to the shaft 5. The shaft 17 is journaled in the top 20 of the seed box. There is also a second orifice 21 in the plate 10, this orifice 21 being provided to permit the seeds to pass therethrough. There are also a series of orifices 22 in the feed plate 18, these orifices 22 being adapted to be disposed over the orifices 21 in the bottom plate, as the feed plate 18 rotates relatively thereto, the feed plate 18 being driven by the shaft 17. On the feed plate and above the orifice 21 in the bottom plate there is a block or cut-off 23, which is secured to a rod 24 which passes upwardly through the seed box 9 and through an opening in the top 20 thereof. The top of the rod 24 is pressed yieldingly downward, by means of a spring 25. In the rear of the frame are disposed two hoe shoes or coverers 26 converging rearwardly so that they are adapted to push together in the rear of the bottom plate the earth which has been plowed by the share 13. In the front of the frame is a hook 27, by means of which a team may be hitched to the frame, and there are also upwardly and rearwardly extending handles 28 which are provided to enable the plowman to direct the course of the planter.

In the operation of my invention, a bottom plate is provided with an orifice 21 which will permit the seed to readily pass therethrough, and a feed plate 18 is also provided with the orifices 22 spaced apart, so that as the plate 18 rotates, one of the orifices 22 will be disposed over the orifice 21 at predetermined intervals, which will permit one of the seeds to drop to the earth at stated periods. It will be understood that when the seed are to be planted close together, the orifices 22 in the seed plate 18 will be relatively more numerous. The bottom and feed plates can quickly be arranged, inasmuch as by means of the nut 16, the shaft 17 may be removed from the bottom plate, and the rod 24 may also be removed by lifting the spring 25. The feed and bottom plates having been arranged in place, the seed box 9 is filled with seed, and the plowman directs his team over the ground which is to be plowed. As the wheel 3 rotates, it drives the sprocket wheel 4, the sprocket chain 8 and the sprocket wheel 7 which rotates the shaft 5, and by means of the bevel gear wheels 19 and 19ª, the shaft 17 is rotated, which rotates the feed plate 18, causing one of the orifices therein to be disposed over the orifice 21 at predetermined intervals. The seed, by gravity, will fall into the orifice 22 in the feed plate 18, so that as the feed plate 18 rotates, one or more of the seeds will pass through the orifice 21, every time one of the orifices 22 becomes disposed thereover. A row is made in which to plant the seeds, by the share 13, and following the bottom plate there are the hoe shoes or coverers 26 which scrape along the ground, one at either side of the hoe, and push the earth into the row to cover the seeds.

Having thus described my invention, I claim as new and desire to secure by Letters Patent:

1. In a planter, a bottom plate having an orifice therein, a seed box, the bottom plate forming the bottom thereof, a shaft journaled in the seed box, a feed plate secured to the shaft which rests against the bottom plate, there being an orifice in the feed plate, a block with a flat lower surface which is disposed on the feed plate over the orifices in the bottom plate, a rod secured to the block, the rod extending upwardly a distance from the feed plate, and means without the seed box adapted for pressing the rod yieldingly downwardly.

2. In a planter, a bottom, a plate having an orifice therein, a seed box, the bottom plate forming the bottom thereof, a shaft journaled in the seed box, a feed plate secured to the shaft which rests against the bottom plate, there being an orifice in the feed plate, a block with a flat lower surface which is disposed on the feed plate over the orifice in the bottom plate, the sides of the block being curved and concentric and completely covering the feed plate for a distance from its inner to its outer side, a rod secured to the block, and means adjustable from without the seed box which yieldingly press the block against the feed plate.

3. In a planter, a bottom, a plate having an orifice therein, a seed box, the bottom plate forming the bottom thereof, a shaft journaled in the seed box, a feed plate secured to the shaft which rests against the bottom plate, there being an orifice in the feed plate, a block with a flat lower surface which is disposed on the feed plate over the orifice in the bottom plate, the sides of the block being curved and concentric and completely covering the feed plate for a distance from its inner to its outer side, a rod secured to the block, means adjustable from without the seed box which yieldingly press the block, a plow share disposed in front of the orifice in the bottom plate, and coverers disposed in the rear thereof.

4. In a planter, a frame, a bottom plate having an orifice therein, a seed box, the bottom plate forming the bottom thereof but being detachable therefrom, means for preventing the rotation of the bottom plate relatively to the sides of the seed box, a shaft journaled in the seed box, a feed plate secured to the shaft, which rests against the bottom plate, there being an orifice in the feed plate, a block with a flat lower surface which is disposed on the feed plate over the orifice in the bottom plate, a rod secured to the block, the rod extending upwardly for a distance, means without the seed box which are adapted for pressing the rod yieldingly downwardly, and means for rotating the shaft.

In testimony whereof I have signed my name to this specification in the presence of two subscribing witnesses.

AUGUST BRINKOETER.

Witnesses:
RUDOLPH LANGE,
CHARLES BILLIMEK.